US006902222B2

(12) United States Patent
Nykiel et al.

(10) Patent No.: US 6,902,222 B2
(45) Date of Patent: Jun. 7, 2005

(54) CARGO COVER SIDE STORAGE SYSTEM AND METHOD OF STORING

(75) Inventors: Henry J. Nykiel, Howell, MI (US); John Acker, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/649,499

(22) Filed: Aug. 26, 2003

(65) Prior Publication Data

US 2005/0046224 A1 Mar. 3, 2005

(51) Int. Cl.[7] .................................................. B60P 7/02

(52) U.S. Cl. .......................... 296/100.02; 296/100.09; 296/100.07

(58) Field of Search ...................... 296/100.02, 100.06, 296/100.09, 100.17, 37.6, 100.01, 100.12, 296/100.07, 100.18, 37.1, 26.08, 174; D12/414.1

(56) References Cited

U.S. PATENT DOCUMENTS

| | | | | |
|---|---|---|---|---|
| 4,005,898 | A * | 2/1977 | Way | 296/174 |
| 4,216,990 | A * | 8/1980 | Musgrove et al. | 296/100.02 |
| 4,653,970 | A | 3/1987 | Ballantyne | 411/555 |
| 4,776,625 | A | 10/1988 | Lobanoff et al. | 296/37.16 |
| 4,946,217 | A * | 8/1990 | Steffens et al. | 296/100.09 |
| 5,782,522 | A * | 7/1998 | DeBono | 296/100.18 |
| 6,082,806 | A * | 7/2000 | Bogard | 296/100.09 |
| D432,489 | S * | 10/2000 | Hall et al. | D12/414.1 |
| 6,186,575 | B1 | 2/2001 | Fisher et al. | 296/100.03 |
| 6,234,560 | B1 | 5/2001 | Hunt | 296/100.11 |
| 6,322,128 | B1 * | 11/2001 | Karrer | 296/100.02 |
| 6,338,520 | B2 * | 1/2002 | Rusu et al. | 296/100.01 |
| 6,340,195 | B1 * | 1/2002 | Hall et al. | 296/100.07 |
| 6,422,635 | B1 | 7/2002 | Steffens et al. | 296/100.09 |
| 6,435,594 | B1 * | 8/2002 | Ekonen et al. | 296/100.09 |
| 6,439,639 | B1 * | 8/2002 | Branting | 296/100.09 |
| 6,454,337 | B2 | 9/2002 | Steffens et al. | 296/43 |
| 6,520,559 | B1 | 2/2003 | Steffens et al. | 296/100.09 |
| 6,527,326 | B2 * | 3/2003 | Henderson | 296/100.09 |
| 6,527,330 | B1 | 3/2003 | Steffens et al. | 296/100.07 |
| 6,533,343 | B2 * | 3/2003 | Bohm et al. | 296/100.02 |
| 6,533,344 | B1 * | 3/2003 | Patterson | 296/100.06 |
| 6,598,930 | B1 * | 7/2003 | Tilton | 296/100.06 |
| 6,634,691 | B2 * | 10/2003 | Henderson | 296/37.6 |
| 6,641,013 | B2 * | 11/2003 | Dise | 296/37.1 |
| 6,641,200 | B2 * | 11/2003 | Rusu | 296/100.07 |
| 6,663,160 | B2 * | 12/2003 | Yarbrough et al. | 296/100.02 |
| 6,702,359 | B2 * | 3/2004 | Armstrong et al. | 296/100.02 |
| 6,755,456 | B2 * | 6/2004 | Addicott | 296/100.07 |
| 2004/0026948 | A1 * | 2/2004 | Novajovsky | 296/26.08 |

* cited by examiner

*Primary Examiner*—Kiran B. Patel
(74) *Attorney, Agent, or Firm*—Laura C. Hargitt

(57) ABSTRACT

A cargo cover storage system for a vehicle that has a cargo bay that is at least partially defined by opposing sidewalls includes first and second rigid cover members adapted to cooperate with each other to at least partially cover and at least partially uncover the cargo bay. The cargo cover storage system further includes first and second bracket assemblies connectable and disconnectable from one of the sidewalls and configured to attach the cover members to one of the sidewalls in a stored position in which the cargo bay is at least partially uncovered. Preferably, the first and second cover members are not touching each other when in the stored position. A third cover member and third and fourth bracket assemblies may also be included within the cargo cover storage system. A method of storing a cargo cover is also provided.

15 Claims, 5 Drawing Sheets

CARGO COVER SIDE STORAGE SYSTEM AND METHOD OF STORING

TECHNICAL FIELD

This invention relates to vehicle cargo bay covers.

BACKGROUND OF THE INVENTION

Pick-ups and utility vehicles are often provided with a bed or cargo bay for transporting cargo. In order to protect the bay and the cargo, such vehicles are sometimes provided with covers for covering the bay. Cargo covers may be connectable and disconnectable from the vehicle and are typically disconnected from the vehicle when cargo that extends above the level of the connected cover is transported. Cargo covers are often disconnected from the vehicle even when the cargo does not extend above the level of the cover or even when no cargo is in the bay. Disconnected cargo covers are often left at the point of departure of the operator. Alternatively, a flexible bag is sometimes provided for storing the covers in the bay when they are not in a connected position.

SUMMARY OF THE INVENTION

A cargo cover system for a vehicle having a cargo bay at least partially defined by opposing sidewalls is provided. The cargo cover system includes first and second rigid cover members adapted to cooperate with each other in at least partially covering and at least partially uncovering the cargo bay. The cargo cover system further includes first and second bracket assemblies connectable and disconnectable from one of the sidewalls and configured to attach the cover members to the one of the sidewalls in a stored position wherein the cargo bay is at least partially uncovered. Preferably, when the cover members are in the stored position, they are not touching each other.

The cargo cover system may further include a third rigid cover member adapted to cooperate with the first and second cover members in covering and uncovering the cargo bay. Third and fourth bracket assemblies that are connectable and disconnectable from the opposed sidewall are configured to attach the third cover member to the opposed sidewall in a stored position wherein the cargo bay is further uncovered.

The first and second bracket assemblies may each include at least two parallel cover retention members, wherein each cover retention member is configured to secure an end of one cover member. The third and fourth bracket assemblies may each include at least one cover retention member. Each of the cover retention members may be formed with a slot matable with one of the cover members.

A method is also provided for storing a cargo cover on a vehicle having a cargo bay at least partially defined by opposed sidewalls. The cargo cover is comprised of at least two cover members adapted to cooperate with each other to at least partially cover and uncover the cargo bay. The method includes disconnecting the cover members from the vehicle such that the cargo bay is at least partially uncovered. The method also includes connecting the cover members to at least one of the sidewalls via at least two bracket assemblies such that the cargo bay remains at least partially uncovered.

The above features and advantages, and other features and advantages of the present invention are readily apparent from the following detailed description of the best mode for carrying out the invention when taken in connection with the accompanying drawings.

DESCRIPTION OF THE PREFERRED EMBODIMENT

Figure 1:
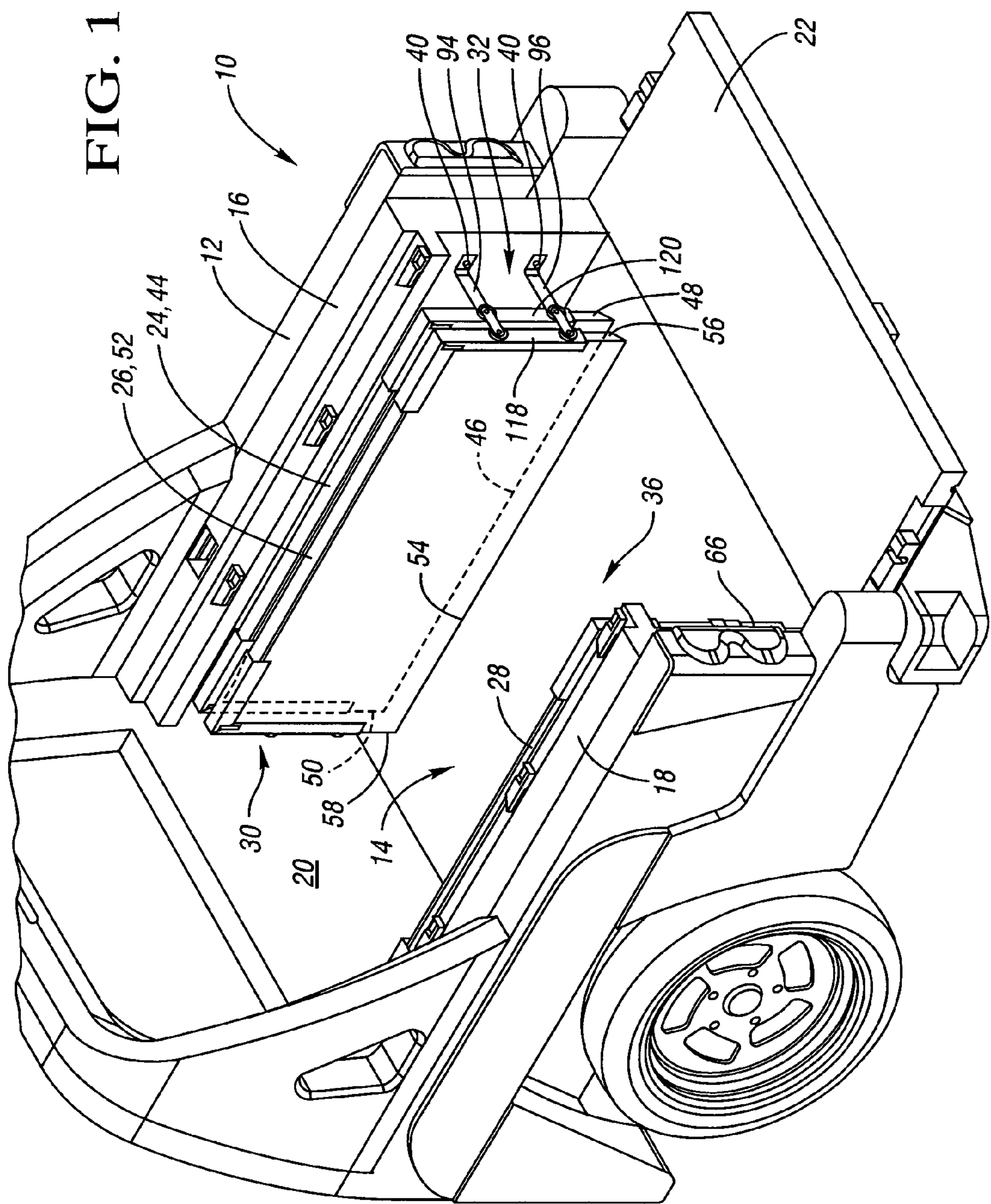
FIG. 1 is a schematic illustration in fragmentary perspective view of a vehicle having a cargo cover system with a first, second and third cover member attached by bracket assemblies to sidewalls of the vehicle to uncover the cargo bay.
Figure 2:
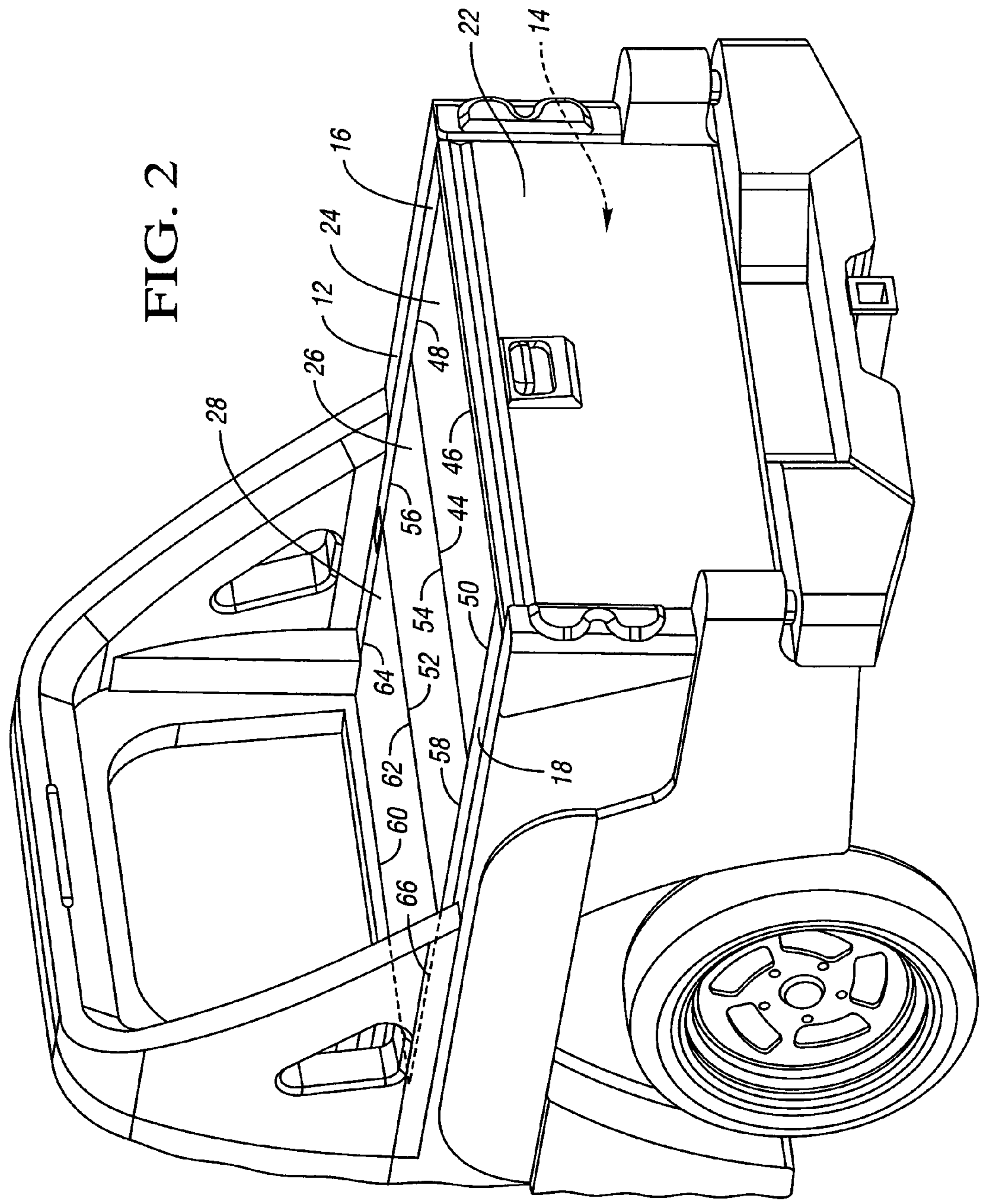
FIG. 2 is a schematic illustration in fragmentary perspective view of the cargo cover system of FIG. 1 with the first, second and third cover members covering the cargo bay.
Figure 3:
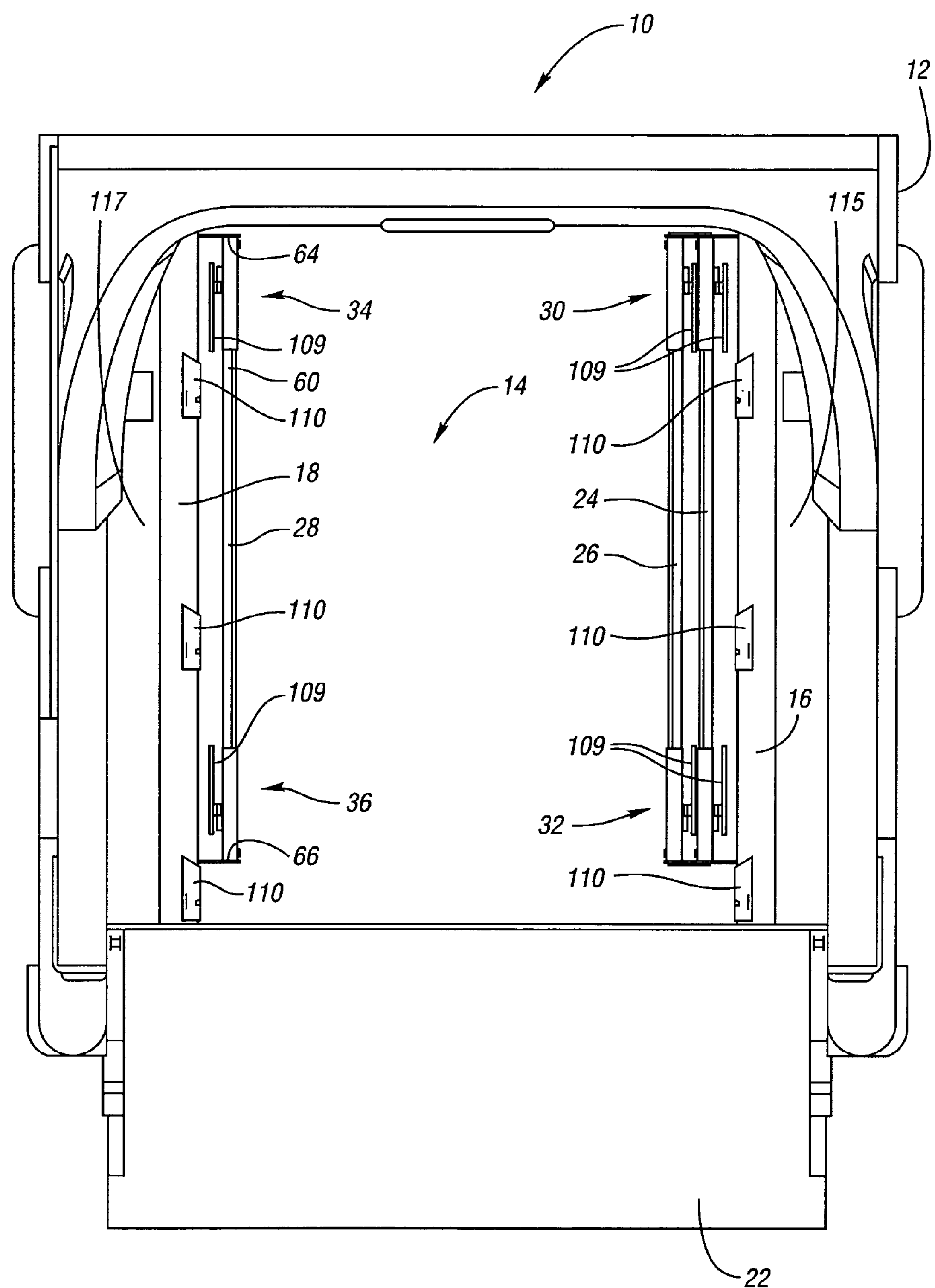
FIG. 3 is a schematic illustration in plan view of the cargo cover system of FIG. 1.

FIGS. 1–3 show a cargo cover system 10 for a vehicle 12 having a cargo bay 14. Referring to FIG. 1, the cargo cover system is in a stored position uncovering the cargo bay 14. The cargo bay 14 is defined by right side structure 16, opposing left side structure 18, a front wall 20 and an endgate 22 shown in an unlatched position. The side structure 16, 18 may be referred to as a right sidewall and a left sidewall, respectively. When the endgate 22 is upright as shown in FIG. 2, the cargo bay is completely defined. The cargo cover system 10 includes a first cover member 24, a second cover member 26 and a third cover member 28. Preferably, the cover members 24, 26, 28 are a rigid plastic material.

Referring to FIG. 1, the cargo cover system 10 includes a first bracket assembly 30 and a second bracket assembly 32. The first and second bracket assemblies 30, 32 are connectable to the right side structure 16. As may be better viewed in FIG. 3, the cargo cover storage system 10 further includes a third bracket assembly 34 and a fourth bracket assembly 36, both connectable to the opposing left side structure 18 of the vehicle 12. For a given vehicle, the side structure to which the cover members are connectable is the structure that is the most inboard, thereby partially defining the cargo bay, and may be side panels or the sides of storage units, depending on the design of the vehicle. As shown in FIG. 1, the second bracket assembly 32 is connected to the right side structure 16 by fasteners 40. The first, third and fourth bracket assemblies are likewise connectable to the respective side structure 16, 18 of the vehicle 12 by similar fasteners 40. The fasteners 40 used on the first bracket assembly are viewable in FIG. 4A. The fasteners used on the fourth bracket assembly are viewable in FIG. 4B. Preferably, quick-release, quarter-turn fasteners with a grab handle, such as those described in U.S. Pat. No. 4,653,970, which is hereby incorporated by reference, are employed for quick connection and disconnection of the bracket assemblies. Those skilled in the art will recognize a variety of other suitable fastening mechanisms.

As may best be viewed in FIG. 2, the first cover member 24 has a first cover member first side 44 and an opposing first cover member second side 46. The first cover member 24 also has a first cover member first end 48 and a first cover member second end 50.

Similarly, the second cover member 26 has a second cover member first side 52 and an opposing second cover member second side 54. The second cover member 26 also has a second cover member first end 56 and a second cover member second end 58.

The third cover member 28 has a third cover member first side 60 and an opposing third cover member second side 62. The third cover member 28 also has a third cover member first end 64 and an opposing third cover member second end 66. As shown in FIG. 2, the first, second and third cover members 24, 26, 28 are adapted to cooperate with each other in covering the cargo bay 14.

Referring again to FIG. 1, when the first, second and third cover members 24, 26, 28 are attached to the side structures (right side structure 16 for the first and second cover members 24, 26 and left side structure 18 for the third cover member 28) the cover members 24, 26, 28 are parallel to the respective side structures 16, 18 and the cargo bay 14 is uncovered.

Figure 4A:
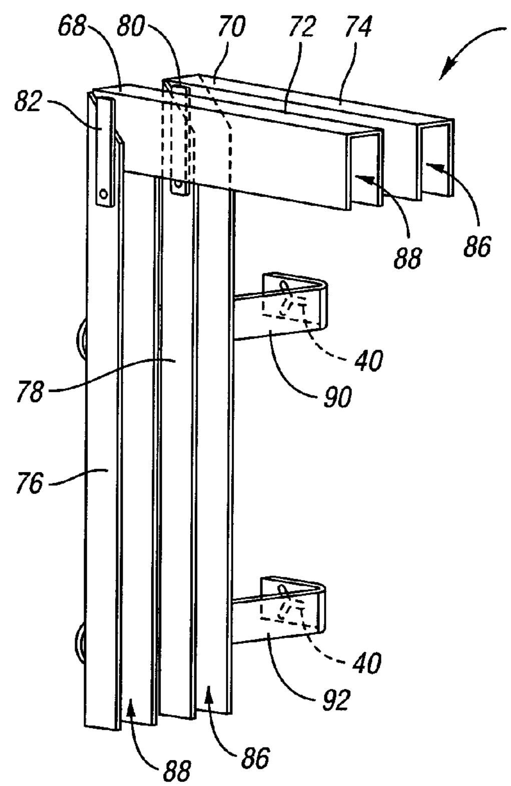
FIG. 4A is a schematic perspective illustration of a bracket assembly used in the cargo cover system of FIG. 1 in an extended position.

Referring to FIG. 4A, the first bracket assembly 30 includes two parallel cover retention members, a first bracket assembly outer cover retention member 68 and a first bracket assembly inner cover retention member 70. The first bracket assembly outer and inner cover retention members 68, 70 include parallel top portions, a first bracket assembly outer top portion 72 and a first bracket assembly inner top portion 74, respectively. Additionally, the first bracket assembly outer cover retention member 68 and the first bracket assembly inner cover retention member 70 include parallel side portions, a first bracket assembly outer side portion 76 and a first bracket assembly inner side portion 78, respectively. The first bracket assembly inner top portion 74 is connected to the first bracket assembly inner side portion 78 by an inner pivotable hinge 80. Likewise, the first bracket assembly outer top portion 72 is connected to the first bracket assembly outer side portion 76 via an outer pivotable hinge 82. The first bracket assembly inner top portion 74 and the first bracket assembly inner side portion 78 form an L-shaped inner cover retention member slot 86. Likewise, the first bracket assembly outer cover retention member top portion 72 and the first bracket assembly outer cover retention member side portion 76 form an L-shaped outer cover retention member slot 88.

A first bracket assembly upper lateral bar 90 is connected to each of the outer and inner cover retention members 68, 70. Likewise, a first bracket assembly lower lateral bar 92 is connected to each of the first bracket assembly outer and inner cover retention members 68, 70. The first bracket assembly upper and lower lateral bars 90, 92 are connectable to fasteners 40 for connecting and disconnecting the first bracket assembly 30 to the right side structure 16 of the vehicle 12. The second bracket assembly 32 is a mirror image of the first bracket assembly 30 shown in FIG. 4A including like inner and outer retention member, inner and outer top portions, inner and outer side portions, upper and lower lateral bars, inner and outer retention member slots as well as upper and lower lateral bars. Second bracket assembly upper and lower lateral bars 94, 96, respectively, are shown in FIG. 1. The lateral bars 94, 96 are removably fastened to the right side structure 16. The first bracket assembly upper and lower lateral bars 90, 92, shown in FIG. 4A, are likewise fastened to the right side structure 16, but are not viewable in FIG. 1.

Figure 4B:
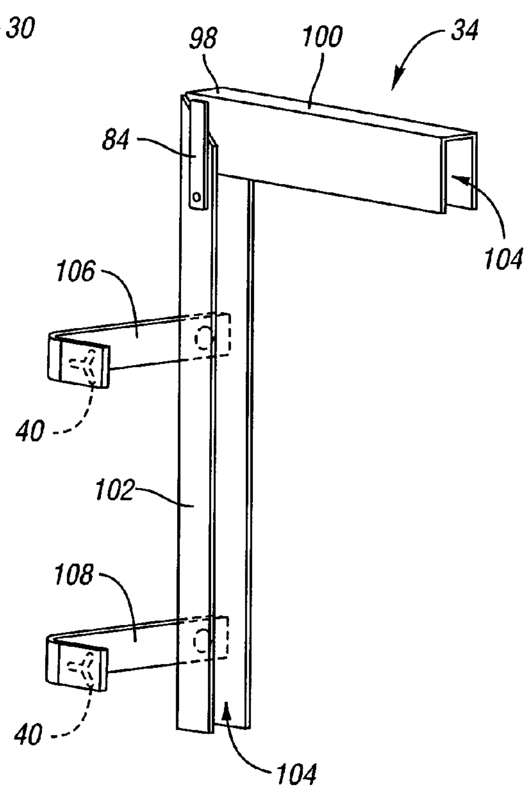
FIG. 4B is a schematic perspective illustration of another bracket assembly used in the cargo cover system of FIG. 1.

Referring to FIG. 4B, the third bracket assembly 34 includes a third bracket assembly cover retention member 98. The third bracket assembly cover retention member 98 includes a third bracket assembly top portion 100 and a third bracket assembly side portion 102. The third bracket assembly top portion 100 and the third bracket assembly side portion 102 are connected by pivotable hinge 84. The third bracket assembly top portion 100 and side portion 102 form an L-shaped third bracket assembly slot 104. A third bracket assembly upper lateral bar 106 and a third bracket assembly lower lateral bar 108 are fastened to the third bracket assembly side portion 102. Fasteners 40 are disposable through the third bracket assembly cover retention member upper and lower lateral bars. The fasteners 40 attach the third bracket assembly 34 to the left side structure 18, as may be viewed in FIG. 3 (fasteners not shown).

The fourth bracket assembly 36, shown from above in FIG. 3, is a mirror image of the third bracket assembly 34 shown in FIG. 4B and described with respect thereto, including a top portion, side portion, a hinge, a slot, upper and lower lateral bars and fasteners.

Figure 4C:
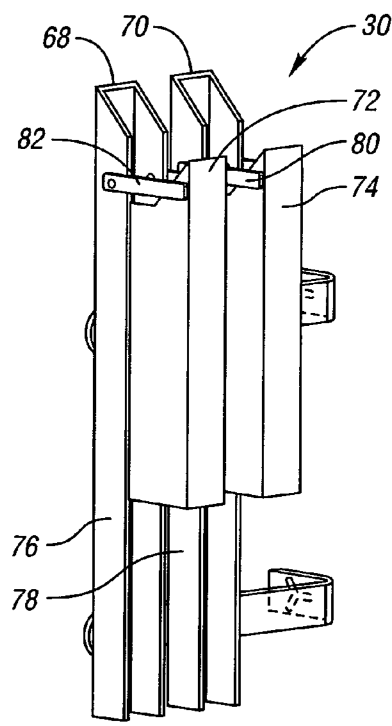
FIG. 4C is a schematic perspective illustration of the bracket assembly of FIG. 4A in a collapsed position.
Figure 4D:
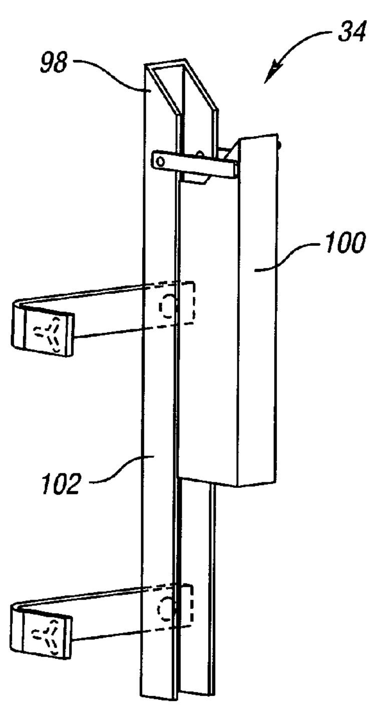
FIG. 4D is a schematic perspective illustration of the bracket assembly of FIG. 4B in a collapsed position.

The first, second and third cover members 24, 26, 28, respectively, are connectable to the vehicle 12 to cover the cargo bay 14 as shown in FIG. 2. Such connection may be made via latches 109 disposed on a bottom face of each of the first, second and third cover members 24, 26, 28 and viewable in FIG. 3. Each of the cover members 24, 26, has two latches 109. Cover 28 has four latches 109 (two shown), two being disposed on each of the sides 64, 66. To connect the first, second and third cover members 24, 26, 28 to the vehicle 12, the bottom face of each cover member having the latches 109 is disposed toward the cargo bay 14. The latches 109 are turned in order to latch the cover member to latch plates 110 disposed on side structures 16 and 18 as shown in FIG. 3. Other means of latching the cover members to the vehicle will be readily apparent to those skilled in the art. When the first, second and third cover members 24, 26, 28 are so latched to the vehicle 12 as to cover the cargo bay 14 as shown in FIG. 2, the first, second, third and fourth bracket assemblies 30, 32, 34, 36 are disconnected from the vehicle 12 by releasing the fasteners 40. As shown in FIGS. 4C and 4D, respectively, the first bracket assembly 30 and the third bracket assembly 34 may be collapsed. As shown in FIG. 4C, the first bracket assembly outer top portion 72 and the first bracket assembly inner top portion 74 may be pivoted downwards to abut the respective first bracket assembly outer and inner side portions 76, 78. Likewise, as shown in FIG. 4D, the third bracket assembly 34 may be collapsed such that the third bracket assembly top portion 100 is pivoted downward to abut the third bracket assembly side portion 102. As discussed with respect to FIGS. 4A and 4B, the second and fourth bracket assemblies 32, 36 are mirror images of the first and third bracket assemblies shown in FIGS. 4C and 4D, respectively. Accordingly, the second and fourth bracket assemblies 32, 36 may be likewise collapsed.

Referring again to FIG. 3, the vehicle 12 may be formed with right and left storage compartments 115, 117, respectively. When the cover members 24, 26, 28 are latched to the vehicle to cover the cargo bay 14, as discussed above, the first and second bracket assemblies 30, 32, respectively, may be stored in right storage compartment 115 formed in the right side structure 16. Likewise, the third and fourth bracket assemblies 34, 36 may be stored in left storage compartment 117 formed in the left side structure 18.

Referring again to FIG. 1, it may be seen that when the first and second cover members 24, 26 are attached to the vehicle 12 by the first and second bracket assemblies 30, 32, respectively, the first cover member second end 50 is disposed in first bracket assembly inner cover retention member slot 86 shown in FIG. 4A. The first cover member first side 44 is likewise disposed in the first bracket assembly inner cover retention member slot 86 shown in FIG. 4A. The second cover member second end 58 is disposed in the first bracket assembly outer cover retention member slot 88 shown in FIG. 4A. Likewise, the second cover member first side 52 is disposed in the first bracket assembly outer cover retention member slot 88 shown in FIG. 4A. The second cover member first end 56 as well as the second member first side 52 are likewise disposed in a slot formed in the second bracket assembly outer cover retention member 118. Likewise, the first cover member first end 48 and the first cover member first side 44 are disposed in a slot formed in second bracket assembly inner cover retention member 120. The slots formed in outer and inner cover retention members 118, 120, respectively, are mirror images of the slots formed in first bracket assembly 30 shown in FIG. 4A and discussed with respect thereto.

As may best be viewed in FIG. 3, third cover member first end 64 and the third cover member first side 60 are disposed in third bracket assembly 34. The first end 64 and first side 60 are disposed in the third bracket assembly slot 104 shown in FIG. 4*b*. Similarly, the third cover member second end 66 and third cover member first side 60 are disposed in a slot formed in the fourth bracket assembly 36. The slot formed in the fourth bracket assembly 36 is a mirror image of the slot 104 formed in the third bracket assembly 34 shown in FIG. 4B and discussed with respect thereto. In this stored position, the cover members 24, 26, 28 are not touching each other.

Figure 5:
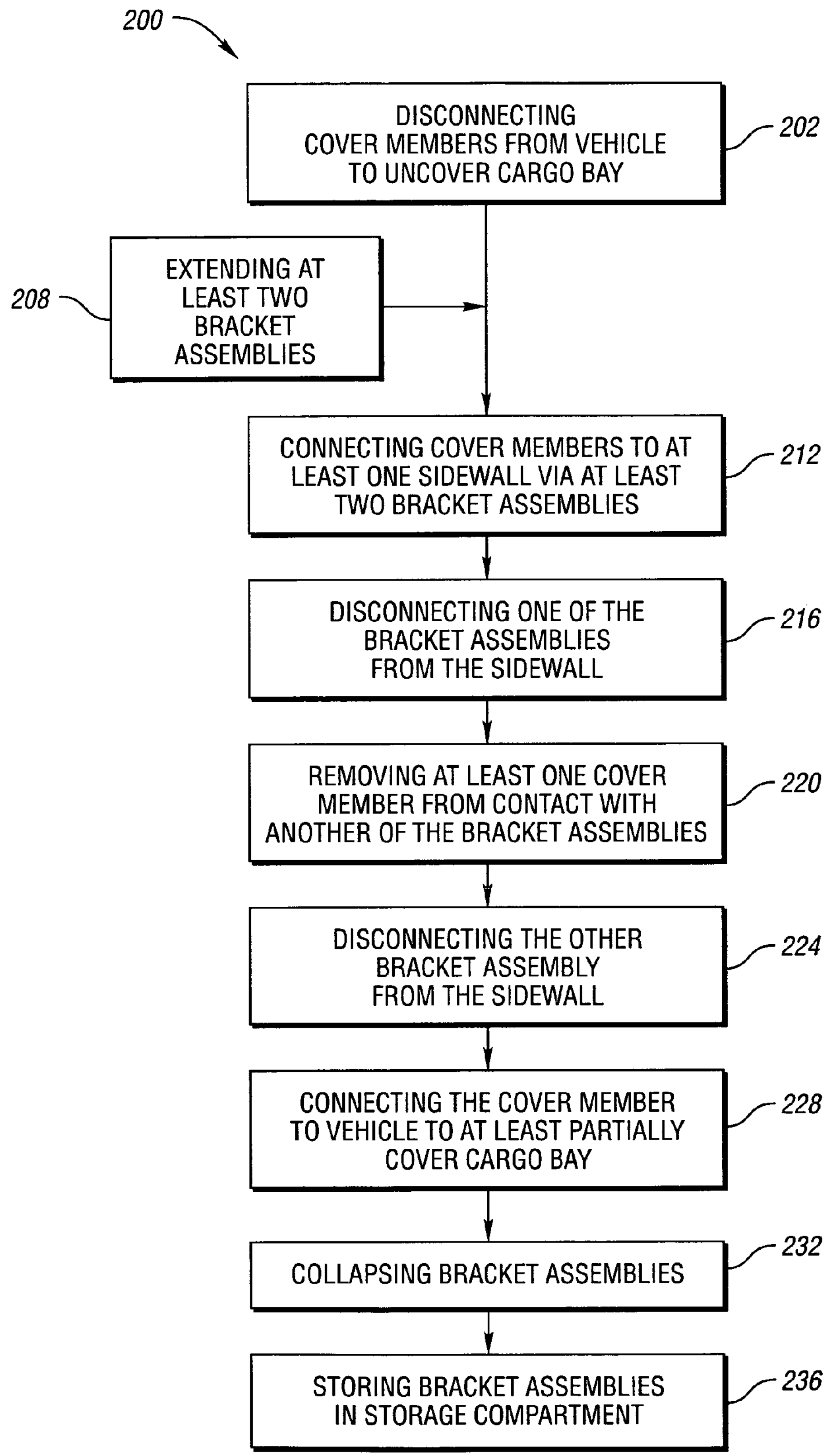
FIG. 5 is a flow diagram of a method of storing a cargo cover for a vehicle having a cargo bay.

Referring to FIG. 5, a method of storing a cargo cover 200 for a vehicle having a cargo bay at least partially defined by opposed sidewalls is provided, wherein the cargo cover is comprised of at least two cover members adapted to cooperate with each other to at least partially cover and uncover the cargo bay. The method includes disconnecting the cover members 202 from the vehicle such that the cargo bay is at least partially uncovered. Referring to FIG. 2, it may be seen that the first, second and third cover members 24, 26, 28 are covering the cargo bay. Referring to FIG. 1, when the cover members 24, 26, 28 are disconnected from the vehicle 12, the cargo bay 14 is uncovered.

Referring again to FIG. 1, first and second bracket assemblies 30, 32 are employed in the cargo cover system 10. Referring again to FIG. 5, the method 200 may further include extending each of the bracket assemblies 208 from a collapsed position to an extended position. The method 200 may further include connecting the cover members to at least one of the sidewalls via the bracket assemblies 212 such that the cargo bay remains at least partially uncovered. First and second bracket assemblies 30, 32 fastened to the right side structure 16 and securing the first and second cover members 24, 26 are shown in FIG. 1. As may be viewed in FIG. 3, a third cover member 28 as well as third and fourth bracket assemblies 34, 36 may be included in the cargo cover system 10. The third cover member 28 is attached to the left side structure 18 of the vehicle 12 by third and fourth bracket assemblies 34, 36. Thus, FIGS. 1 and 3 display the results of performing 202, 208 and 212 of the method 200 described above.

Referring again to FIG. 1, the cargo cover system 10 is illustrated having cargo cover members 24, 26, 28 attached to the vehicle 12 in a stored position. As best illustrated in FIG. 3, first, second, third and fourth bracket assemblies 30, 32, 34, 36 attach the cover members 24, 26, 28 to the vehicle 12 by connecting to right and left side structures 16, 18, respectively, of the vehicle 12. The first, second, third and fourth bracket assemblies 30, 32, 34, 36 are also disconnectable from the right and left side structures 16, 18, respectively.

Referring again to FIG. 5, the method 200 may further include disconnecting one of the bracket assemblies from said at least one of the sidewalls 216. The method 200 may further include removing at least one cover member from contact with another of the bracket assemblies 220. The method may further include disconnecting that other bracket assembly from the sidewall 224. The method 200 may further include connecting said at least one cover member to the vehicle 228 to at least partially cover the cargo bay. A vehicle having first, second and third cover members 24, 26, 28 removed from bracket assemblies 30, 32, 34, 36 and connected to the vehicle 12 to cover the cargo bay 14 and having the bracket assemblies disconnected from the right and left side structures 16, 18, respectively, of the vehicle 12 is illustrated in FIG. 2 reflecting 216, 220, 224 and 228 of the method 200.

As illustrated in FIGS. 4A–4D and discussed above with respect thereto, each of the first, second, third and fourth bracket assemblies may be extendable and collapsible. Referring again to FIG. 5, the method 200 may include collapsing the bracket assemblies 232. As best viewed in FIG. 3, the vehicle 12 is formed with right storage compartment 115 and left storage compartment 117. The collapsed bracket assemblies illustrated in FIGS. 4C–4D may be stored in the right and left storage compartments 115, 117. Accordingly, referring again to FIG. 5, the method 200 may further include storing the bracket assemblies in a storage compartment included on the vehicle 236. Preferably, the first, second, third and fourth bracket assemblies 30, 32, 34, 36, respectively, are stored in the right and left side compartments 115, 117 shown in FIG. 3 when the cover members 24, 26, 28 are connected to the vehicle 12 as shown in FIG. 2. The method of storing a cargo cover 200 need not be performed in the order depicted in FIG. 5.

While the best mode for carrying out the invention has been described in detail, those familiar with the art to which this invention relates will recognize various alternative designs and embodiments for practicing the invention within the scope of the appended claims.

What is claimed is:

1. A cargo cover storage system for a vehicle having a cargo bay, wherein the cargo bay is at least partially defined by opposed sidewalls, the system comprising:

first and second rigid cover members adapted to cooperate with each other in at least partially covering and at least partially uncovering the cargo bay; and first and second bracket assemblies connectable and disconnectable from one of the sidewalls and configured to attach said cover members to said one of the sidewalls in a stored position wherein the cargo bay is at least partially uncovered;

wherein said bracket assemblies are configured to attach said cover members in the stored position such that said cover members are not touching each other.

2. The cargo cover storage system of claim 1, wherein said bracket assemblies are connectable and disconnectable from said one of the sidewalls by a plurality of releasable fasteners.

3. The cargo cover system of claim 1, wherein each cover member has opposed sides and opposed ends;

wherein said bracket assemblies each include two parallel cover retention members; and wherein each cover retention member of the first bracket assembly is configured to secure one end of one cover member and each cover retention member of the second bracket assembly is configured to secure a respective opposed end of said one cover member.

4. The cargo cover system of claim 3, wherein each cover retention member of the first bracket assembly and each cover retention member of the second bracket assembly is further configured to secure one side of said one cover member.

5. The cargo cover system of claim 4, wherein each cover retention member of the first bracket assembly is formed with a slot matable with said one end and said one side; and wherein each cover retention member of the second bracket assembly is formed with a slot matable with said respective opposed end and said one side.

6. The cargo cover system of claim 1, further comprising:

a third rigid cover member adapted to cooperate with said first and second cover members in covering and uncovering the cargo bay; and third and fourth bracket assemblies connectable and disconnectable from the opposed sidewall and configured to attach said third cover member to said opposed sidewall in a stored position wherein the cargo bay is further uncovered.

7. The cargo cover system of claim 6, wherein said third and fourth bracket assemblies are connectable and disconnectable from said opposed sidewall by a plurality of releasable fasteners.

8. The cargo cover system of claim 7, wherein said third cover member has opposed sides and opposed ends;

wherein the third and fourth bracket assemblies each include a cover retention member; and wherein the third bracket assembly cover retention member is configured to secure one end of said third cover member and the fourth bracket assembly cover retention member is configured to secure the opposed end of said third cover member.

9. The cargo cover system of claim 8, wherein said cover retention members of said third and fourth bracket assemblies are further configured to secure one side of said third cover member.

10. The cargo cover system of claim 9, wherein said cover retention member of said third bracket assembly is formed with a slot matable with said one end and said one side of the third cover member; and wherein said cover retention member of said fourth bracket assembly is formed with a slot matable with said opposed end and said one side of the third cover member.

11. A cargo cover storage system for a vehicle having a cargo bay, wherein the cargo bay is at least partially defined by opposed sidewalls, the system comprising:

first and second rigid cover members adapted to cooperate with each other in at least partially covering and at least partially uncovering the cargo bay;

first and second bracket assemblies connectable and disconnectable from one of the sidewalls and configured to attach said cover members to said one of the sidewalls in a stored position wherein the cargo bay is at least partially uncovered;

a third rigid cover member adapted to cooperate with said first and second cover members in covering and uncovering the cargo bay; and third and fourth bracket assemblies connectable and disconnectable from the opposed sidewall and configured to attach said third cover member to said opposed sidewall in a stored position wherein the cargo bay is further uncovered.

12. The cargo cover system of claim 11, wherein said third and fourth bracket assemblies are connectable and disconnectable from said opposed sidewall by a plurality of releasable fasteners.

13. The cargo cover system of claim 12, wherein said third cover member has opposed sides and opposed ends;

wherein the third and fourth bracket assemblies each include a cover retention member; and wherein the third bracket assembly cover retention member is configured to secure one end of said third cover member and the fourth bracket assembly cover retention member is configured to secure the opposed end of said third cover member.

14. The cargo cover system of claim 13, wherein said cover retention members of said third and fourth bracket assemblies are further configured to secure one side of said third cover member.

15. The cargo cover system of claim 14, wherein said cover retention member of said third bracket assembly is formed with a slot matable with said one end and said one side of the third cover member; and wherein said cover retention member of said fourth bracket assembly is formed with a slot matable with said opposed end and said one side of the third cover member.

* * * * *